(12) United States Patent
Tester et al.

(10) Patent No.: US 7,375,682 B1
(45) Date of Patent: May 20, 2008

(54) ALWAYS-ON SATELLITE POSITIONING RECEIVER

(75) Inventors: David P. Tester, Swindon (GB);
Stephen P. Graham, Henley-on-Thames (GB)

(73) Assignee: Air Semiconductor, Ltd., Wiltshire (GB)

( * ) Notice: Subject to any disclaimer, the term of this patent is extended or adjusted under 35 U.S.C. 154(b) by 0 days.

(21) Appl. No.: 11/613,219

(22) Filed: Dec. 20, 2006

(51) Int. Cl.
*G01S 1/02* (2006.01)
(52) U.S. Cl. .............................. 342/357.06; 342/357.05
(58) Field of Classification Search ........... 342/357.05, 342/357.06, 357.08, 357.12; 701/213, 215
See application file for complete search history.

(56) References Cited

U.S. PATENT DOCUMENTS

| 5,365,450 A * | 11/1994 | Schuchman et al. ...... 455/456.3 |
| 2007/0042790 A1* | 2/2007 | Mohi et al. .............. 455/456.5 |

* cited by examiner

*Primary Examiner*—Dao L Phan
(74) *Attorney, Agent, or Firm*—Christopher P. Maiorana, PC

(57) ABSTRACT

A method for establishing a position of a device is disclosed. The method generally includes the steps of (A) receiving an input signal from a receiver listening to a plurality of satellites in a positioning system, (B) calculating (i) a plurality of estimated Doppler shifts of the satellites, (ii) an estimated position of the device and (iii) an estimated velocity of the device, (C) generating a plurality of pseudo-ranges in an intermediate signal based on all of (i) the input signal, (ii) the estimated Doppler shifts, (iii) the estimated position and (iv) the estimated velocity and (D) generating the position in an output signal based on the pseudo-ranges.

20 Claims, 7 Drawing Sheets

US 7,375,682 B1

ALWAYS-ON SATELLITE POSITIONING RECEIVER

FIELD OF THE INVENTION

The present invention relates to a method and/or architecture for positioning receivers generally and, more particularly, to an always-on satellite positioning receiver.

BACKGROUND OF THE INVENTION

Conventional positioning systems, such as Global Position Satellite (GPS) receivers, are increasingly being integrated into battery operated user equipment (i.e., personal digital assistants and cellular telephones). The positioning systems calculate the locations of the user equipment based on signals received from the GPS satellites. The locations are used to provide applications and services for the benefit of the users. Owing to power consumption constraints in battery operated equipment, conventional positioning systems are normally only enabled on demand from the users. Hence, the applications and services can only be delivered following explicit requests from the users to establish current locations. As such, some applications and services will not function as intended where the users do not request location updates for an extended time. Therefore, a challenge in conventional implementations is to acquire the position fix as quickly as possible to minimize any delay in the response of location-based applications and services.

SUMMARY OF THE INVENTION

The present invention concerns a method for establishing a position of a device. The method generally comprises the steps of (A) receiving an input signal from a receiver listening to a plurality of satellites in a positioning system, (B) calculating (i) a plurality of estimated Doppler shifts of the satellites, (ii) an estimated position of the device and (iii) an estimated velocity of the device, (C) generating a plurality of pseudo-ranges in an intermediate signal based on all of (i) the input signal, (ii) the estimated Doppler shifts, (iii) the estimated position and (iv) the estimated velocity and (D) generating the position in an output signal based on the pseudo-ranges.

The objects, features and advantages of the present invention include providing an always-on satellite positioning receiver that may (i) provide automatic position updates, (ii) consume minimal electrical power, (iii) appear to a user to be always operational, (iv) provide a fast position acquisition, (v) operate independently of cellular telephone network assistance and/or (vi) operate through weak and absent satellite conditions.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention describes a method and/or architecture of a satellite positioning receiver developed for use in handheld battery operated equipment. The receiver may be useful in equipment such as cell phones, personal digital assistants, laptop computers, palm computers, heads-up displays and other battery-powered and/or portable equipment. The receiver is generally designed to be powered on at all times and therefore is optimized for continuous tracking of a user's current position. As the receiver is "always on", simplifications in the architecture may be made to enable lower power consumption compared with conventional techniques.

By keeping the positioning capability active at all times, the receiver may be continuously aware of the current position. Continuous knowledge of the current position may enable substantial simplifications in the positioning system implementation. In turn, the simplifications generally reduce the power consumption. The always-on feature may enhance the utility to the user of the satellite positioning receiver. For example, applications that use the location information may proactively deliver location-based services to the user without any prior input from the user.

Figure 1:
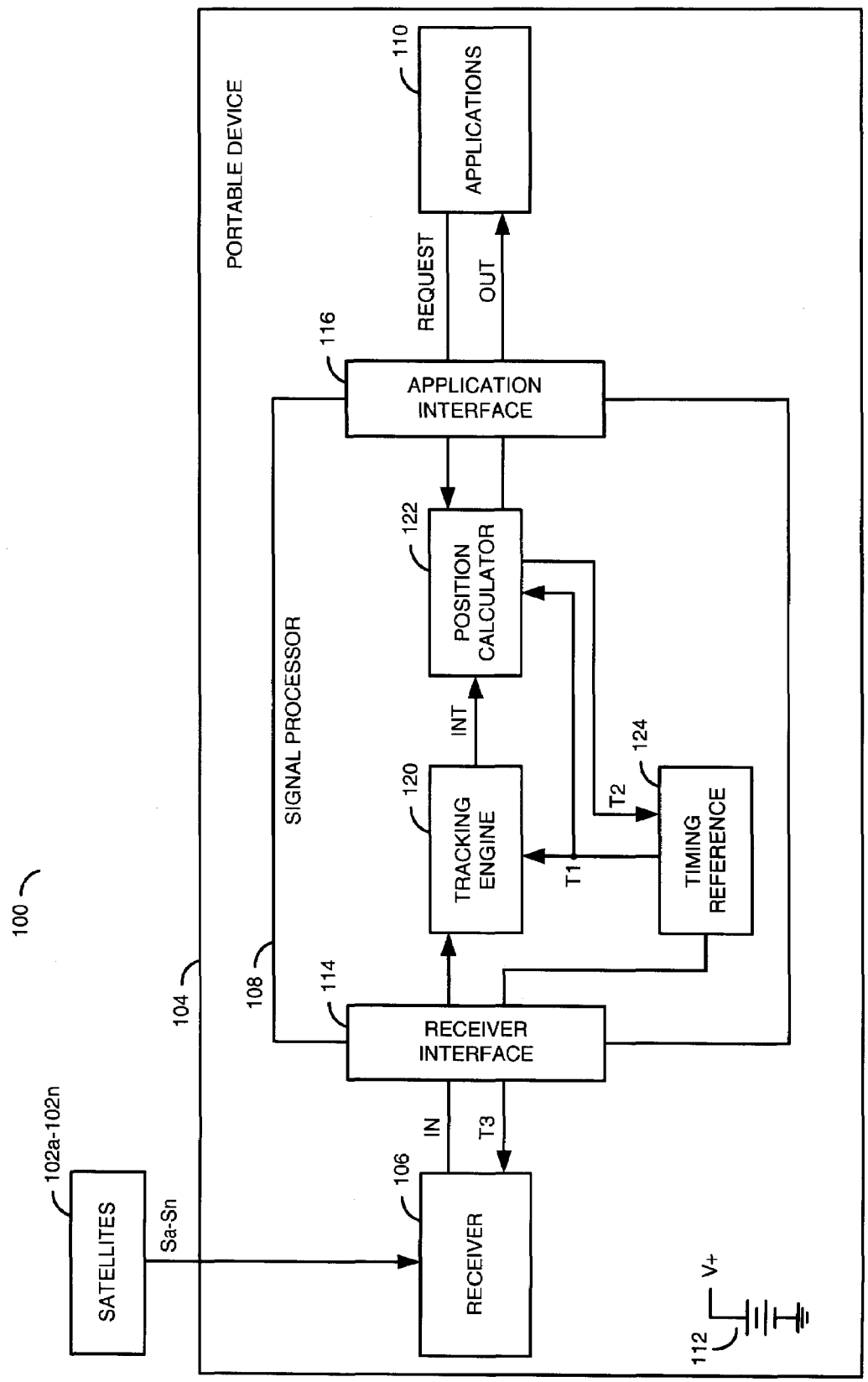
FIG. 1 is a block diagram of a system in accordance with a preferred embodiment of the present invention.

Referring to FIG. 1, a block diagram of a system 100 is shown in accordance with a preferred embodiment of the present invention. The system (or architecture) 100 may be implemented as a satellite navigation system. The system 100 generally comprises multiple (e.g., 24 to 30) satellites 102a-102n and a device (or circuit) 104. Each of the satellites 102a-102n may generate a respective signal (e.g., Sa-Sn) receivable by the device 104. Due to the positioning of the satellites 102a-102n and various obstructions, the device 104 may receive only a subset of the signals Sa-Sn at any given time. A position, a velocity and a current time may be calculated by the device 104 based on the received signals Sa-Sn.

In some embodiments, the satellites 102a-102n may be part of the Global Positioning System (GPS) system. In other embodiments, the satellites 102a-102n may be part of the GLObal NAvigation Satellite System (GLONASS). Other space-based positioning systems, such as the proposed Galileo project, may be used as the source of the signals Sa-Sn. Earth-based positioning systems may be used to supplement the satellite-based systems. For example, the earth-based systems may provide a measurement of the current location by triangulation.

The device 104 may be implemented as a handheld (or portable) satellite receiver. The device 104 may be operational to calculate a device position, a device velocity (both magnitude and direction) and a current time using information from the signals Sa-Sn. The device 104 may be implemented as a variety of items, such as a cell phone, a personal digital assistant, a laptop computer, a GPS receiver, a heads-up display and the like.

The device 104 generally comprises a circuit (or module) 106, a circuit (or module) 108, a circuit (or module) 110 and a circuit (or module) 112. The signals Sa-Sn may be received by the circuit 106. An input signal (e.g., IN) may be generated by the circuit 106 and presented to the circuit 108 through an interface 114. The circuit 108 may generate a timing signal (e.g., T3) that is transferred back to the circuit 106 though the interface 114. An output signal (e.g., OUT) may be generated by the circuit 108 and presented through an interface 116 to a circuit 110. The circuit 110 may generate and present a request signal (e.g., REQUEST) to the circuit 108 through the interface 116.

The circuit 106 may be implemented as a radio front-end receiver. The circuit 106 may be operational to listen to the viewable satellites 102a-102n through the signals Sa-Sn and appropriate earth-based transmission, if implemented. Operationally, the circuit 106 may down-convert and digitize the available signals Sa-Sn to generate the signal IN. Implementations of the circuit 106 may be in hardware, software or a combination of both hardware and software.

The circuit 108 may be implemented as a signal processor circuit. The circuit 108 is generally operational to calculate the device position and the device velocity based on the information received in the signal IN. Furthermore, the circuit 108 may maintain a current time for the device 104. Timing related information may be presented from the circuit 108 to the circuit 106 in the signal T3. Some or all of the device position, the device velocity and the current time many be presented from the circuit 108 to the circuit 110 in the signal OUT either periodically, aperiodically and/or on demand in response to a request made by assertion of the signal REQUEST. For example, an application (e.g., a cellular telephone function) in the circuit 110 may be configured to get a current location update periodically (e.g., every 20 seconds). If an update is missed for some reason, the system 100 may wait a short time (e.g., 5 seconds) and then deliver the updated location measurement.

The circuit 110 may be implemented as one or more processors executing one or more applications (e.g., software modules). The circuit 110 may be operational to utilize the device position, the device velocity and/or the current time to provide services and/or benefits to a user of the device 104. Examples of position-based services may include, but are not limited to, localized advertising, public service information, weather, traffic conditions, business hours, directions, proximity alarms, games and other applications/services that depend on the user's location. Furthermore, the circuit 110 may include a cellular telephone capability. The cellular telephone capability may receive an interrupt when a new user location has been either measured or estimated. In some embodiments, the interrupt and new user location may be used to provide a location-based personalization of the phone application (e.g., automatically adjust the ring tone based on location).

The circuit 112 may be implemented as one or more batteries. The circuit 112 generally provides electrical power to all of the other circuits. The batteries may be implemented as replaceable batteries and/or rechargeable batteries. Other power sources may be implemented to meet the criteria of a particular application.

The interface 114 may implement a receiver interface. The interface 114 generally communicates the satellite information from the circuit 106 to the circuit 108 in the signal IN. Timing information and control signals may be presented from the circuit 108 back to the circuit 106 through the interface 114.

The interface 116 may be implemented as an application interface. The interface 116 generally communicates the device position, the device velocity and the current time from the circuit 108 to the circuit 110 periodically, aperiodically and/or on demand from an external application. The demand may be passed through the interface 116 in the signal REQUEST.

Referring still to FIG. 1, the circuit 108 generally comprises a circuit (or module) 120, a circuit (or module) 122 and a circuit (or module) 124. The signal IN may be received by the circuit 120. An intermediate signal (e.g., INT) may be generated by the circuit 120 and presented to the circuit 122. The circuit 122 may generate the signal OUT and receive the signal REQUEST. A timing signal (e.g., T1) may be generated by the circuit 124 and presented to both the circuit 120 and the circuit 122. A timing update signal (e.g., T2) may be generated by the circuit 122 and presented to the circuit 122. The circuit 124 may also generate the signal T3.

The circuit 120 may be implemented as a tracking engine. The circuit 120 may be operational to search for the different satellites 102a-102n that may be in view of the circuit 106. Searching is generally conducted across a frequency range to compensate for Doppler frequency shifts in the signals Sa-Sn caused by the relative motion of the device 104 and the satellites 102a-102n. The searching may also be conducted in a window of time to find the correct positions of pseudo-random code sequences in the signals Sa-Sn. Conclusions from the pseudo-random code sequence searches generally give first approximations for a user time bias, reference epoch and a distance from the device 104 to respective satellites 102a-102n. The approximate distances are generally called pseudo-ranges.

Since the circuit 120 is always on, the circuit 120 generally has a-priori knowledge of which satellites 102a-102n are in view. The circuit 120 may also have a good estimate of the satellite positions and the satellite velocities relative to the device 104. A good estimate of the resulting Doppler shifts may be calculated based on the estimated satellite positions and the estimated satellite velocities. Furthermore, the circuit 106 is generally aware of a local frequency reference that is (i) drifting relative to an absolute time (e.g., GPS time) and (ii) has an absolute frequence error. The device 104 may also generate a good estimate of the device position and the device velocity. From the device position, the device velocity and the absolute frequency error, the circuit 120 may estimate the proper positions of the pseudo-random code sequences in the signals Sa-Sn transmitted from the available satellites 102a-102n. A result is generally a reduction in the searching performed while calculating the pseudo-range to each of the satellites 102a-102n and hence a corresponding reduction in the power consumed in performing the calculations.

The circuit 122 may be implemented as a position calculator. The circuit 122 generally uses the pseudo-ranges to the several satellites 102a-102n, information regarding the Doppler shifts, knowledge of the satellite positions and knowledge of the satellite trajectories to calculate the device position and the device velocity of the device 104. Operations within the circuit 122 may be simplified by estimating the current device position and the current device velocity from knowledge of one or more previously calculated device positions and one or more previously calculated device velocities. In turn, the simplifications may result in a reduced power consumption.

The circuit 124 may be implemented as a timing reference circuit. The circuit 124 may be used to generate a current local time in the signal T1. Corrections to the current time may be made based on satellite timing information received from the circuit 122 in the signal T2. Timing information for the circuit 106 may be generated in the signal T3.

From time to time, the signals Sa-Sn from the satellites 102a-102n may not be clearly visible from the receiver 106. For example, signal degradation or signal loss may happen when the user takes the device 104 deep inside a building. Signal loss may also happen as part of a deliberate strategy to shutdown the circuit 106 for short periods to save power.

During periods of signal-loss and/or weak signals Sa-Sn, the circuit 124 generally assures that an accurate timing reference is maintained. For example, under weak signal conditions, the circuit 108 may integrate over multiple navigation bits (e.g., 20 millisecond periods) and use data wipeoff to allow coherent integration. Knowledge of how good or bad the local timebase/reference frequence actually is generally provides an upper bound on the number of pseudo-random noise spreading chips to be searched in order to reacquire the GPS signals.

When the signal conditions improve and/or return to normal, the always-on circuit 120 may rapidly reacquire a new position lock by accurately knowing the elapsed time since the last position fix, the user time bias and both the absolute error and the drift error on the local frequency reference. In such a case, the new positions of the satellites, the Doppler shifts and the positions in the pseudo-random code sequences may be accurately estimated by the circuit 120. Thereafter, reacquisition of the satellites 102a-102n may utilize modest calculations and power.

Figure 2:
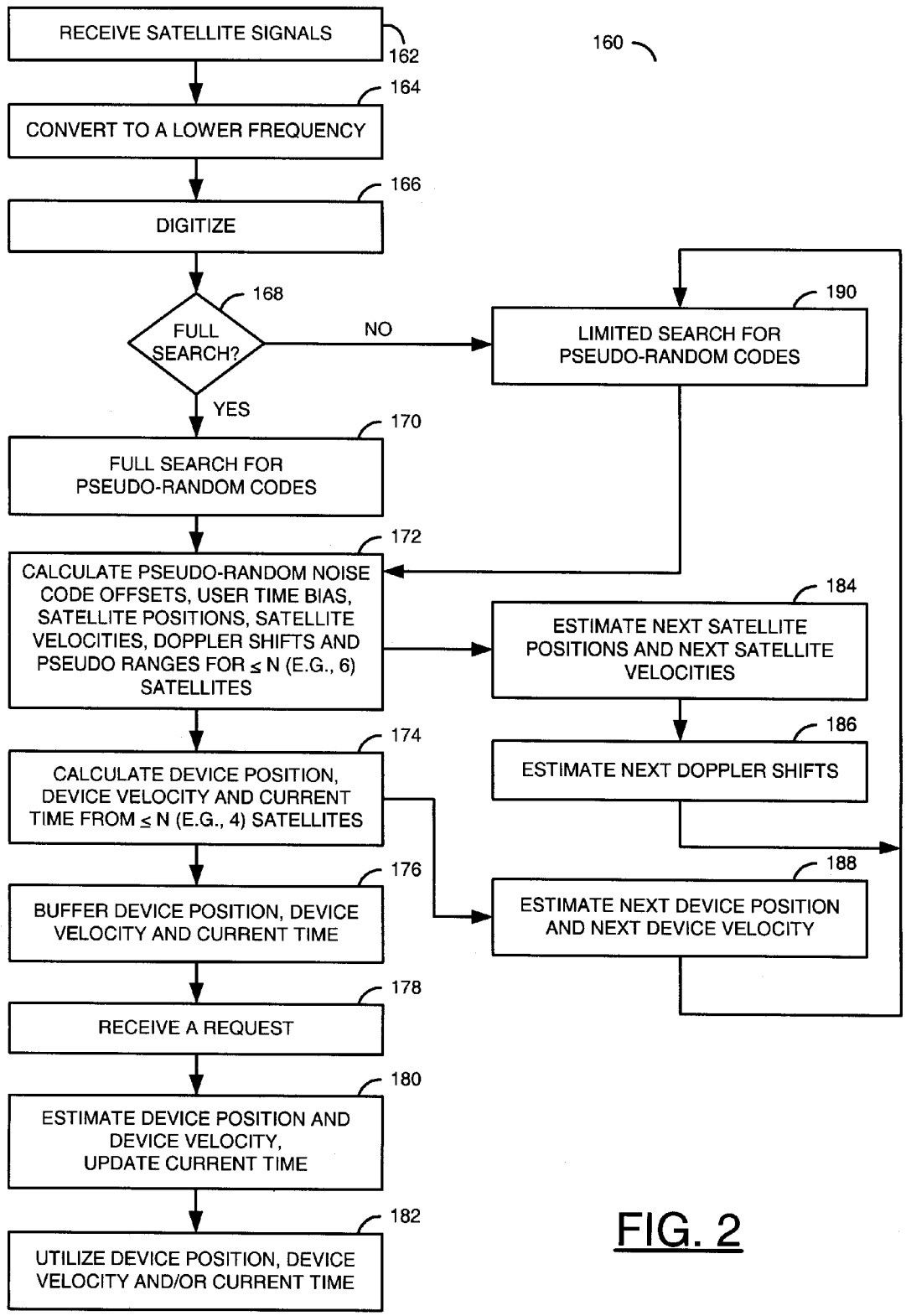
FIG. 2 is a flow diagram of an example satellite position operation.

Referring to FIG. 2, a flow diagram of an example positioning method 160 performed by the device 104 is shown. The method (or process) 160 may be implemented as a satellite positioning operation. The method 160 generally comprises a step (or block) 162, a step (or block) 164, a step (or block) 166, a step (or block) 168, a step (or block) 170, a step (or block) 172, a step (or block) 174, a step (or block) 176, a step (or block) 178, a step (or block) 180, a step (or block) 182, a step (or block) 184, a step (or block) 186, a step (or block) 188 and a step (or block) 190.

In the step 162, the circuit 106 may receive one or more of the signals Sa-Sn. The received signals Sa-Sn may be frequency converted to the intermediate frequency or a baseband frequency in the step 164. The resulting signal may then be digitized in the step 166 to create the signal IN.

If the signal IN contains an initial set of data from the satellites 102a-102n, a full search for the pseudo-random codes may be performed by the circuit 120 (e.g., the YES branch of the step 168). In the step 170, the circuit 120 may search in both frequency and in time for the pseudo-random codes received in the signal IN. The search may be limited to the strongest signals. Satellites known to be well below the horizon may be eliminated from the search.

Once the pseudo-random codes have been identified, a correlation peak from a prompting correlator may be examined to estimate the signal energy. If a sub-chip time offset exists in the locally generated pseudo-random noise code, a local reference frequency error (e.g., due to a Doppler shift) may be corrected. The circuit 120 may then calculate the satellite positions, the satellite velocities and the Doppler shift information in the step 172. The pseudo-ranges and associated Doppler shift information may be presented to the circuit 122 in the signal INT. To conserve power, the calculations may be (i) limited to a restricted number of satellites (e.g., at most six satellites), (ii) performed periodically (e.g., once every 15 second to 30 seconds), (iii) performed aperiodically and/or (iv) performed on demand.

In the step 174, the circuit 122 may calculate the position of the device, the velocity of the device 104 and a "GPS time" (e.g., 14 seconds different from Universal Time as of 2006). The user time bias from the GPS time may be presented to the circuit 124 in the signal T2. The calculations are generally based on the pseudo-ranges and the Doppler shift information received in the signal INT. The current time may also be available to the circuit 122 via the signal T1. Once calculated, the device position, the device velocity and the current time may be buffered by the circuit 122 in the step 176.

To save power, the calculations may be limited to a restricted number of satellites. Generally, the circuit 122 may calculate a Geometric Dilution Of Precision (GDOP) for all of the satellites 102a-120n that may be visible. A combination of the satellites 102a-102n (e.g., at most four) that gives a best dilution of precision metric may be used by the circuit 122. In contrast, a typical position-velocity calculation takes into account 6 to 12 of the satellites 102a-102n.

The circuit 110 may send a request to the circuit 122 for one or more of (i) the device position, (ii) the device velocity and (iii) the current time via the signal REQUEST in the step 178. The circuit 122 may respond to the request by estimating the device position and/or the device velocity at the time of the request based on prior device positions and/or prior device velocities in the step 180. The circuit 122 may also update the current time in the step 180 for presentation in the signal OUT. In the step 182, the circuit 110 may utilize the requested information to provide location/time based services and/or applications to the user.

During subsequent sets of searches and calculations for the signal IN, the circuit 108 may use prior knowledge of the satellite positions, the satellite velocities, the device position, the device velocity and the current time to simplify the workload. In the step 184, the circuit 120 may estimate the next satellite positions and the next satellite velocities. Thereafter, the circuit 120 may estimate the next expected Doppler shifts of the satellites 102a-102n in the step 186. Likewise, the circuit 122 may calculate a next device position and a next device velocity in the step 188. A combination of the estimated satellite positions, satellite velocities, Doppler shifts, device position and device velocity may be used in the circuit 120 to perform a limited search of the next set of pseudo-random codes in the step 190. Once the pseudo-random codes have been found, the circuit 120 may continue calculating the actual satellite positions, the actual satellite velocities and the actual Doppler shift information as before in the step 176.

Figure 3:
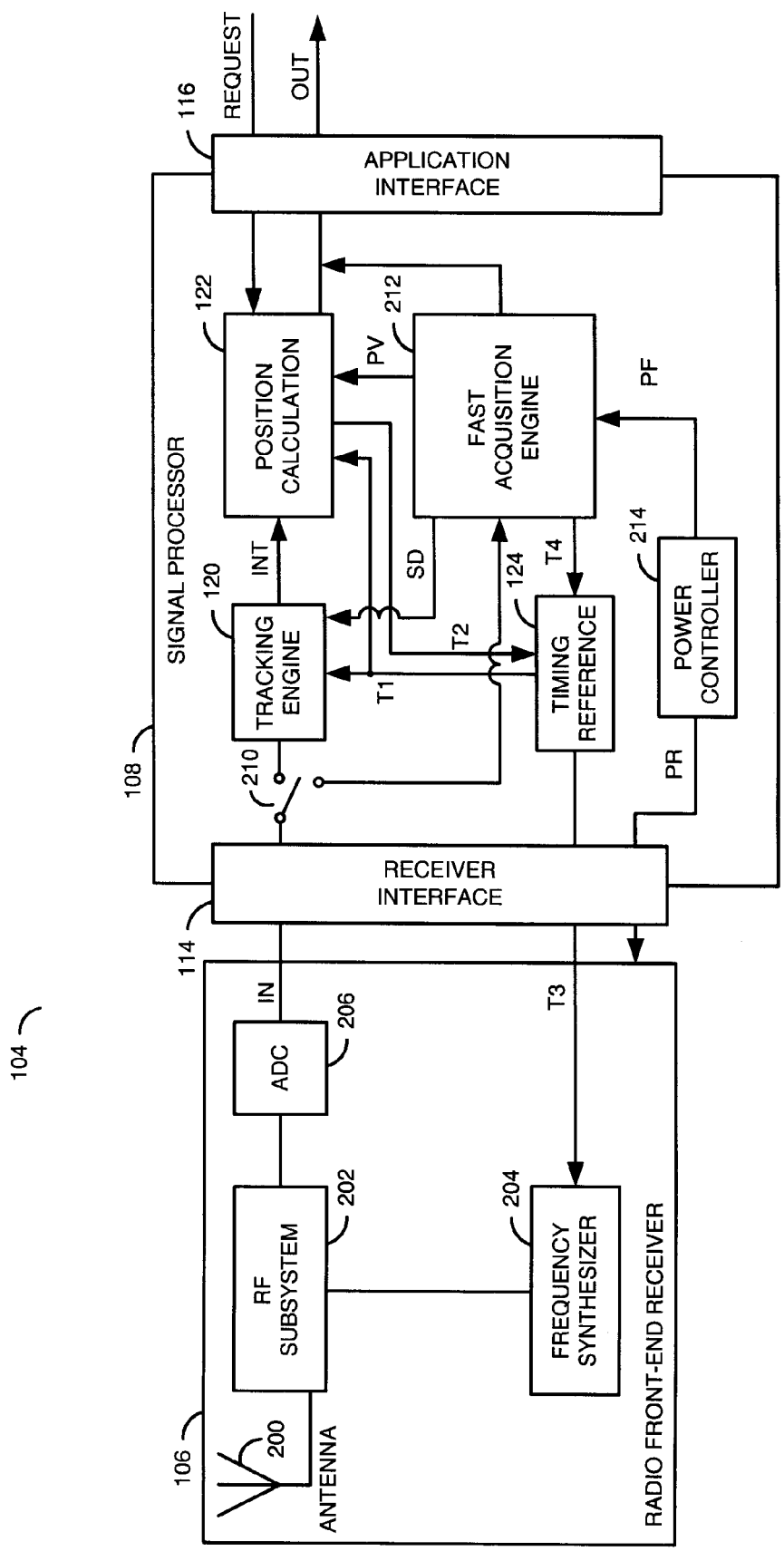
FIG. 3 is a detailed block diagram of an example design of a device.

Referring to FIG. 3, a detailed block diagram of an example design of the device 104 is shown. The circuit 106 generally comprises an antenna 200, a circuit (or module) 202, a circuit (or module) 204 and a circuit (or module) 206. The signals Sa-Sn may be received by the antenna 200. The circuit 206 may generate the signal OUT. The signal T3 may be received by the circuit 204.

The antenna 200 may be implemented as a GPS antenna. The antenna 200 is generally tuned to receive the signals Sa-Sn. In some embodiments, the antenna 200 may have a single receiving element (e.g., a patch antenna). In some embodiments, the antenna 200 may have multiple elements for better coverage. The antenna 200 may also be implemented as a multi-function antenna. For example, the antenna 200 may be used for both the satellite signals Sa-Sn, cellular telephone signals, network signals (e.g., WiFi) and/or other radio frequency communications.

The circuit 202 may be implemented as a radio-frequency (RF) subsystem. The circuit 202 may filter, amplify and convert the signals Sa-Sn received from the antenna 200 to a lower (baseband or intermediate) frequency. If multiple antenna 200 are implemented, multiple circuits 202 may be respectively implemented.

The circuit 204 may be implemented as a frequency synthesizer. The circuit 204 may generate one or more local oscillator signals used by the circuit 206 for down-converting the received signals to the baseband frequency or the intermediate frequency. Generation and control of the local oscillator signals may be based on the timing information received in the signal T3.

The circuit 206 may be implemented as an analog to digital converter. The circuit 206 is generally operational to convert the baseband/intermediate frequency signal generated by the circuit 202 into a digital format. The digitized information from the circuit 206 is generally passed in the signal IN to the circuit 108 for further processing.

Because the circuit 120 is always "on" and always tracking, the circuit 206 may generate larger (e.g., 3-bit) than normal digital values in the signal IN. As such, a design of each of the correlators in the circuit 120 may be more complex than normal. Such 3-bit digital values are unacceptable in typical designs since the whole data path of a typical fast acquisition engine would become significantly (e.g., 10 times) more complex. By having a more accurate analog to digital conversion, a noise figure of the circuit 106 may be (deliberately) degraded. The degraded noise figure generally saves power in a low noise amplifier without affecting an overall system noise figured. For example, the circuit 106 may consume up to 50% less power than a typical radio front-end receiver.

The circuit 108 generally comprises the circuit 120, the circuit 122, the circuit 124, an optional switch (or module) 210, an optional circuit (or module) 212 and an optional circuit (or module) 214. The signal IN may be received by the switch 210 and selectively routed to either the circuit 120 or the circuit 212. Both the circuit 122 and the circuit 212 may also generate the signal OUT.

A signal (e.g., PV) may be generated by the circuit 212 and presented to the circuit 122. A signal (e.g., SD) may also be generated by the circuit 212 and presented to the circuit 120. The circuit 212 may generate a timing signal (e.g., T4) presented to the circuit 124. A control signal (e.g., PR) may be generated by the circuit 214 and presented to the circuit 106. Another control signal (e.g., PF) may be generated by the circuit 214 and presented to the circuit 212.

The switch 210 is generally used to route the signal IN to either the circuit 120 or the circuit 212. When the circuit 108 is in an a low power acquisition mode, the switch 210 may route the signal IN to the circuit 120. When the circuit 108 is in a fast acquisition mode, the switch 210 generally routes the signal IN to the circuit 212.

The circuit 212 may be implemented as a fast acquisition engine. The circuit 212 may be operational to rapidly acquire a position fix of the device 104 from an unknown state. The device position, the device velocity and the current time may be presented from circuit 212 in the signal OUT to the circuit 110. The device position and the device velocity may be presented to the circuit 122 in the signal PV. GPS time may be presented to the circuit 124 in the signal T4.

A low power consumption implementation of the device architecture may not have the rapid position acquisition capability of the circuit 212. However, since the device 104 is always on, the rapid position lock feature may be useful in only a few situations. In the low power acquisition mode, the initial acquisition may be performed by the circuit 120.

Implementation of the fast position lock capability in the circuit 212 may be helpful in certain situations. For example, compliance with the E911 legislation in the United States of America specifies a rapid position fix feature under all conditions. In another example, some applications may depend upon a quick position fix when the device 104 is initially switched on. To satisfy such criteria, the device 104 may include the circuit 212. The circuit 212 generally uses the same radio front-end (e.g., circuit 106) as the circuit 120. However, the circuit 212 generally comprises independent hardware and/or software dedicated to the fast acquisition mode. The circuit 212 may normally be powered off (or in a low power mode) except in the special circumstances when a fast position fix is appropriate. Therefore, implementing the circuit 212 to have very low power consumption may not be a high priority.

The circuit 214 may be implemented as a power controller. The circuit 214 is generally operational to control electrical power and/or power consumption of the circuit 106 and the circuit 212. Assertion of the signal PR may cause the circuit 106 to be powered on and/or operate in a full power mode. De-assertion of the signal PR may cause power to be removed from the circuit 106, or the circuit 106 to operate in a low power consumption mode. Likewise, assertion of the signal PF may cause application of power to the circuit 212 and/or operation of the circuit 212 in a full power mode. De-assertion of the signal PF may cause the removal of power to the circuit 212 or cause the circuit 212 to operate in a low power mode.

Control of the power consumption of the circuit 106 and/or the circuit 212 may be achieved by partitioning a hardware design and/or a software design of the device 104. For example, the circuit 106, the circuit 110, the circuit 120, the circuit 122, the circuit 124 and the circuit 212 may each be implemented in hardware and/or software running on one or more processing engines with one or more memory subsystems. To control the power, the circuit 212 may be implemented in separate hardware and/or software from the other circuits. Similarly, the circuit 106 may be implemented on dedicated hardware/software allowing power to be applied and removed as appropriate.

Figure 4:
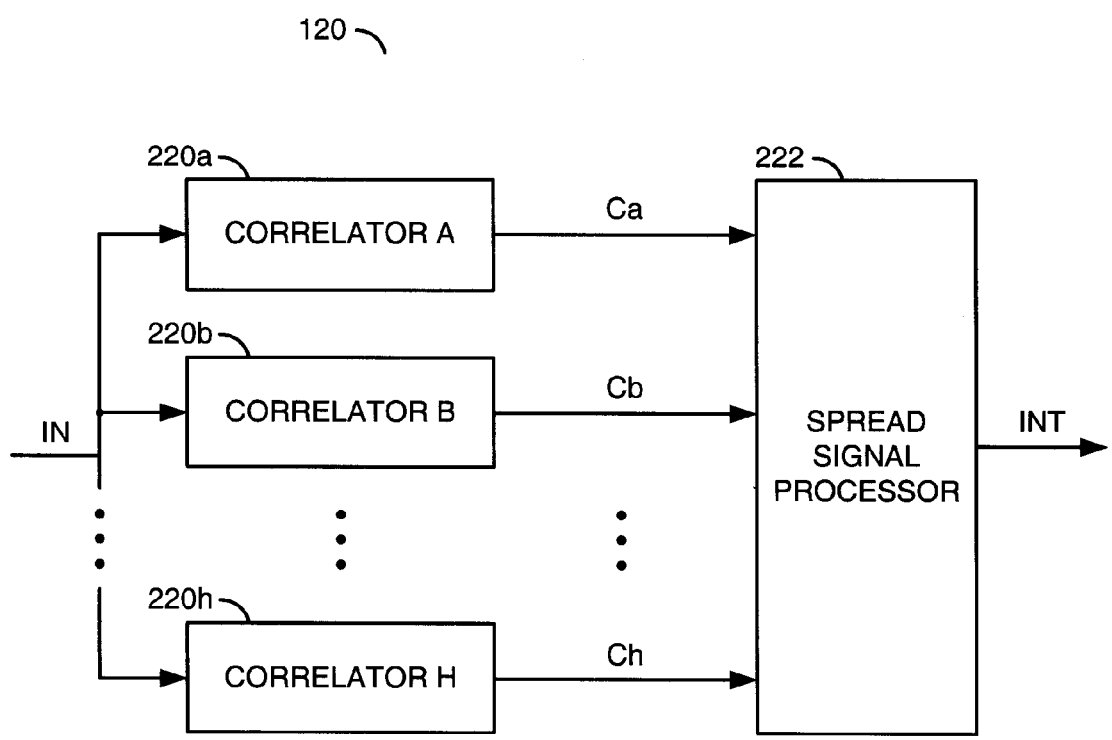
FIG. 4 is a detailed block diagram of an example implementation of a tracking engine.

Referring to FIG. 4, a detailed block diagram of an example implementation of the circuit 120 is shown. The circuit 120 generally comprises multiple circuits (or modules) 220a-220n and a circuit (or module) 222. Each of the circuits 220a-220n may receive the signal IN. The circuit 222 may generate the signal INT. Each of the circuits 220a-220h may generate a respective signal (e.g., Ca-Ch) that is presented to the circuit 222.

Each of the circuits 220a-220h may be implemented as a correlator. The circuits 220a-220h generally compare the patterns received in the signal IN to locally generated versions of the pseudo-random codes. A correlation value is generated based on each comparison and presented in a respective signal Ca-Ch. A high correlation value generally indicates that the circuit 220a-220h has found a good match between a locally generated pseudo-random code and a unique pseudo-random code from one of the satellites 102a-102n. To conserve power, a finite number (e.g., 6 to 50) of the circuits 220a-220h may be implemented. In some embodiments, as few as 6-10 of the circuits 220a-220h may be employed in a design.

The circuit 222 may be implemented as a spread signal processor. The circuit 222 is generally operational to process the signals Ca-Ch. The processing generally includes, but is not limited to, controlling the search for the pseudo-random codes, identifying when a pseudo-random code have been found, identifying the particular satellite 102a-102n for each pseudo-random code found, calculating the pseudo-range to the satellites 102a-102n, calculating the velocity of the satellites 102a-102n and calculating Doppler shift information for the satellites 102a-102n.

Figure 5:
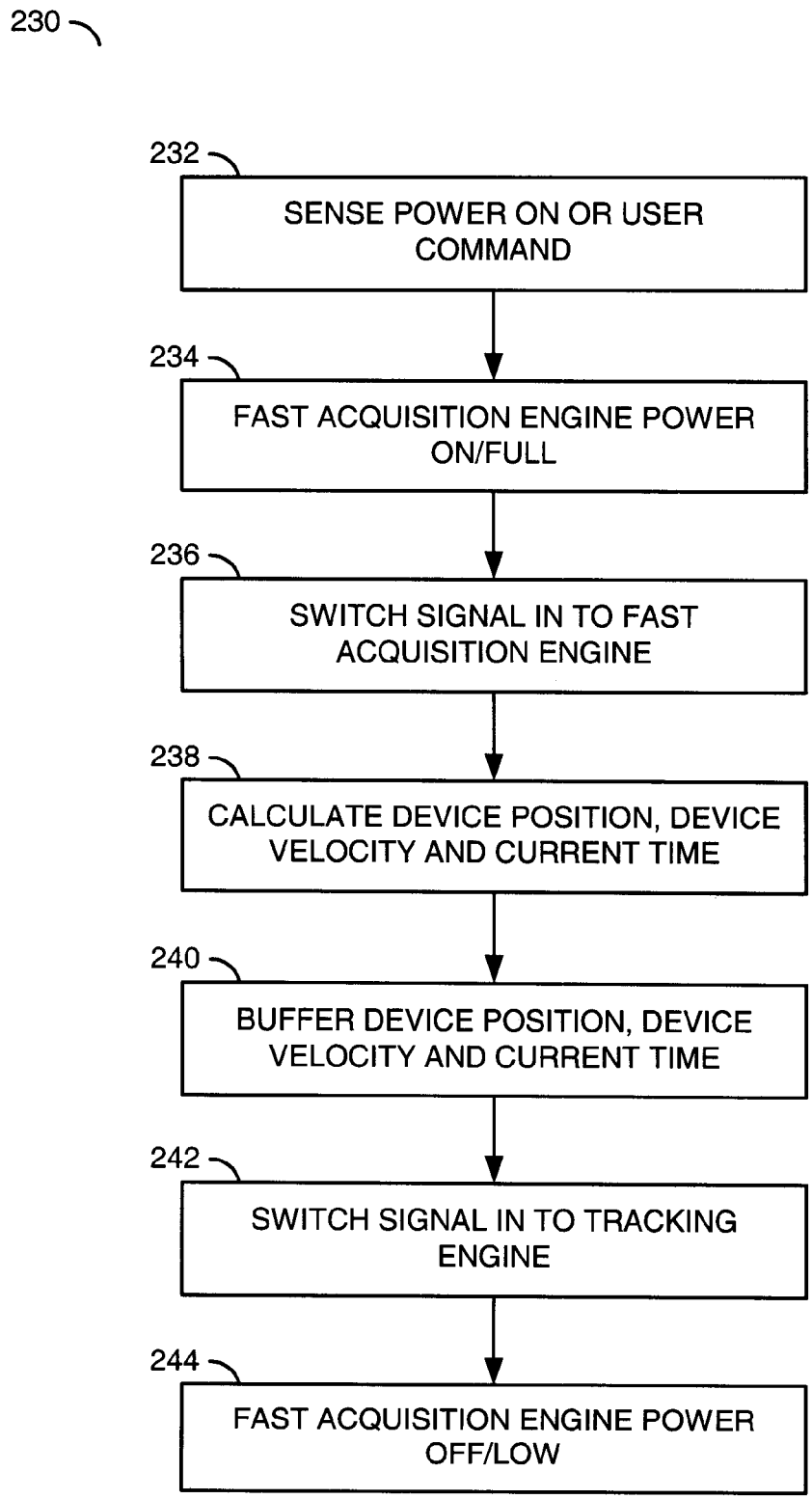
FIG. 5 is a flow diagram of an example method for controlling the power consumption of a fast acquisition engine.

Referring to FIG. 5, a flow diagram of an example method 230 for controlling the power consumption of the circuit 212 is shown. The method (or process) 230 may implement a fast acquisition power control method. The method 230 generally comprises a step (or block) 232, a step (or block) 234, a step (or block) 236, a step (or block) 238, a step (or block) 238, a step (or block) 240 and a step (or block) 242.

In the step 232, the circuit 214 may sense at least one of (i) a powering on condition in the device 104 and/or (ii) a user command to quickly establish the device position. Power to the circuit 212 may be applied (power off to power on) or power consumption of the circuit 212 may be increased (low power to full power) by the circuit 214 in the step 234. In the step 236, the switch 210 may be commanded to route the signal IN to the circuit 212.

In the step 238, the circuit 212 may rapidly acquire the device position, the device velocity and the time based on the information received in the signal IN. The device position, the device velocity and the current time may be buffered in the step 240. Finally, the circuit 214 may either remove power from the circuit 212 or command the circuit 214 into a low power mode in the step 242.

Figure 6:
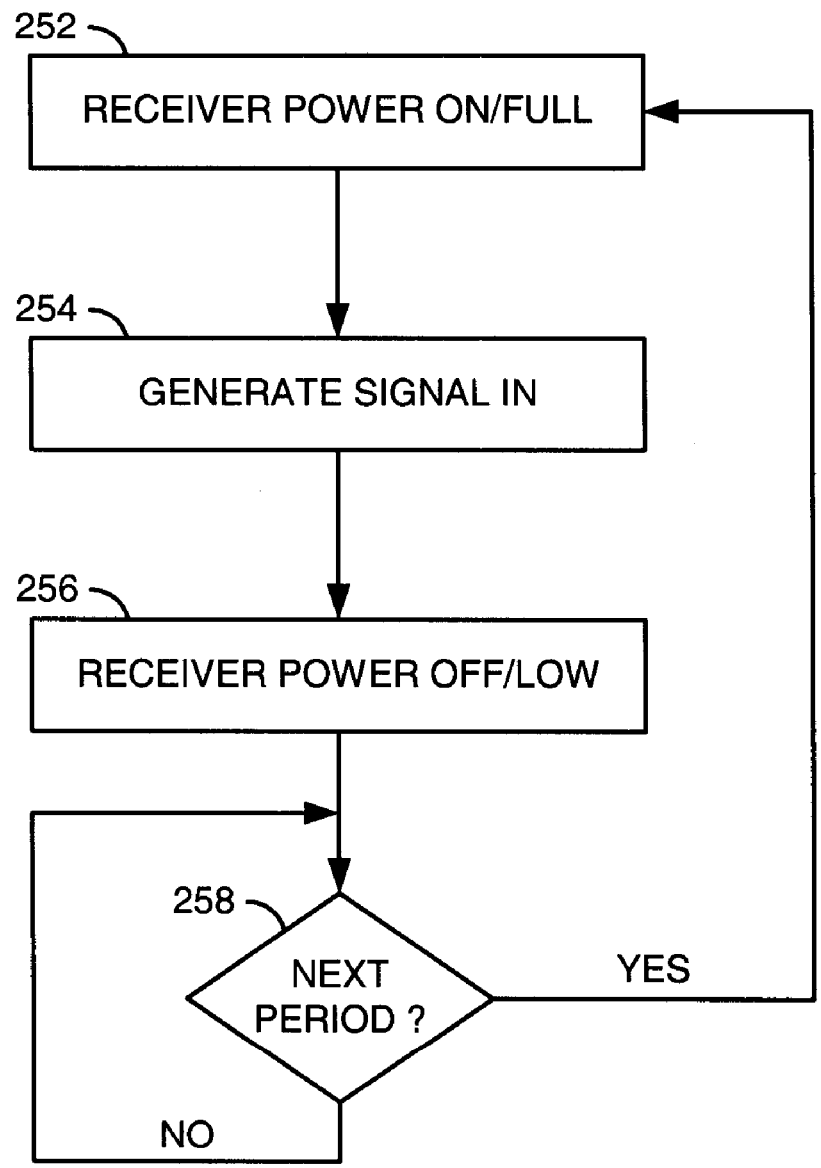
FIG. 6 is a flow diagram of an example method for controlling the power consumption of a radio receiver.

Referring to FIG. 6, a flow diagram of an example method 250 for controlling the power consumption of the circuit 106 is shown. The method (or process) 250 may implement a radio power control method. The method 250 generally comprises a step (or block) 252, a step (or block) 254, a step (or block) 256 and a step (or block) 258.

In the step 252, the circuit 214 may command a periodic (and/or aperiodic and/or on demand) increase (e.g., power off to power on or low power to full power) in the power to the circuit 106. Once operational, the circuit 106 may process the signals Sa-Sn in the step 254 to generate at least one set of satellite data the signal IN. Thereafter, the circuit 214 may command a lowering (e.g., power on to power off or full power to low power) of the power to the circuit 106 in the step 256. The circuit 214 may then wait for a next period (e.g., the YES branch of step 258) to repeat the cycle of power to the circuit 106 to capture another set of satellite data.

In the present invention, the circuit 108 is always on leading to several simplifications in the implementation. The simplifications generally reduce the power consumption in the device 104 making an always on implementation more feasible. A first simplification may be the absence of a fast acquisition capability. If the device 104 is always on, then acquiring the user's position rapidly from an unknown state may have few practical applications. If the circuit 212 (FIG. 3) is normally powered off, the rest of the circuitry may have a much simpler design and, therefore, have a lower power consumption.

Another simplification may involve an absence of network assistance. To speed up a position fix, some satellite positioning receivers in battery operated equipment (especially cell phones) make use of assistance data transmitted from a cellular network. The assistance data typically comprises satellite ephemeris data and a first approximation to the position of the cell phone based on a cell-identification code. Accessing the satellite data and approximate position involves communication with the cellular network, engaging numerous sub-systems within the cell phone and additional calculations to make use of the data.

In the present invention, such assistance data has minimal value since the user's position and the satellite ephemeris information may be continuously tracked. No communications with the cellular network are established and no calculations based on the cellular network data are performed. The lack of cellular network interactions may result in a simplified design of the cell phone and thus a reduction in the total power consumed.

A further simplification may be associated with an indoor performance of the device 104. Acquiring the position of a typical satellite positioning receiver that is indoors uses many more calculations than if the typical satellite positioning receiver is outdoors. The additional calculations are used to compensate for the much weaker signal conditions from the satellites while indoors. When rapid position acquisition is performed indoors, the typical satellite positioning receivers will consume significantly more power.

A feature of the present invention is that the device position may be tracked continuously as the user moves the device 104 from outdoors to indoors, thereby eliminating the power-hungry position acquisition indoors. From time to time, the signal conditions indoors may be so poor that continuous position tracking is temporarily no longer possible.

Figure 7:
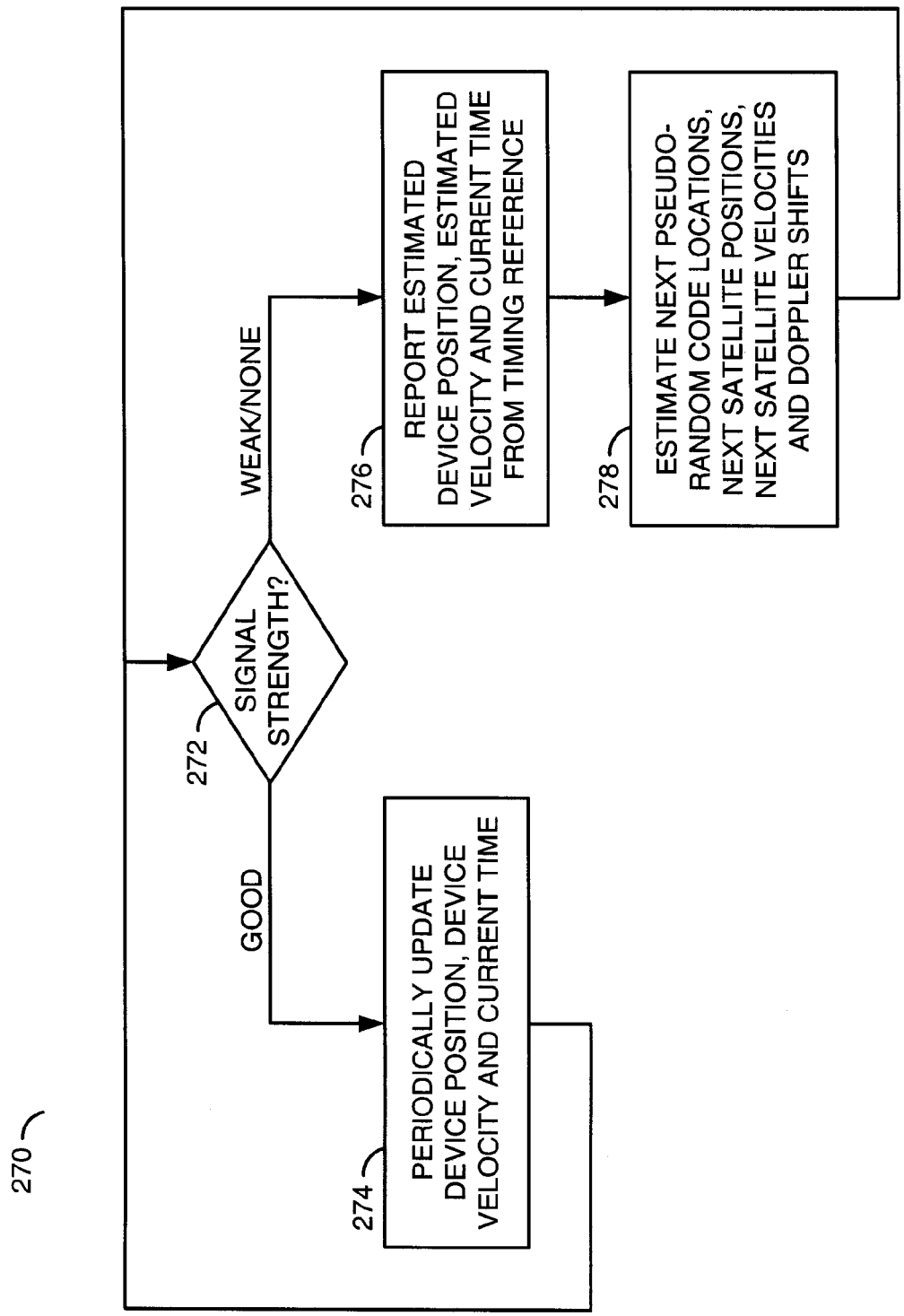
FIG. 7 is a flow diagram of an example method for coping with weak signal and no signal conditions.

Referring to FIG. 7, a flow diagram of an example method 270 for coping with weak signal and no signal conditions is shown. The method (or process) 270 may implement a signal dropout method. The method 270 generally comprises a step (or block) 272, a step (or block) 274, a step (or block) 276 and a step (or block) 278.

In the step 272, a strength of the satellite signals is checked. If the signal strength is good (e.g., the GOOD branch of step 272), the method may continue with the step 274. In the step 274, the device 104 may periodically update the device position, the device velocity and the current time, as described in detail above.

If the signal strength is weak, insufficient satellite signals are being received and/or no satellite signals are being received (e.g., the WEAK/NONE branch of step 272), the method may continue with the step 276. In the step 276, an estimated position may be reported whenever the circuit 122 is interrogated by an external circuit 110. The estimated position may be a last known device position or an extrapolated device position. An estimated device velocity may be reported as zero, unknown or the last known velocity. A current time determined by the circuit 124 may also be reported. While signal conditions remain weak (e.g., the user is still indoors), the method 270 generally achieves a position accuracy that is better than a few tens of meters. Such an accuracy may be at least as accurate as other indoor positioning methods.

In the step 278, circuit 124 generally maintains an accurate timing fix so that the circuit 120 may continuously estimate the next pseudo-random code locations, the next satellite positions, the next satellite velocities and the next Doppler shifts based on an elapsed time since the last position fix. When more favorable signal conditions return (e.g., the GOOD branch of step 272), the estimations may enable the device 104 to rapidly update the device position, the device velocity and/or the current time.

A satellite positioning receiver embedded in user equipment and implemented in accordance with the present invention may, after initially acquiring an initial position, continuously track the position of the user equipment. By continuously tracking the position, the power-hungry problem of rapid position acquisition may be eliminated allowing for a much lower power satellite tracking receiver to be designed. Since the satellite positioning receiver may have a low power consumption, implementing an always on satellite positioning receiver in battery operated handheld equipment is generally feasible. The battery operated handheld equipment may include, but is not limited to, cell phones, personal digital assistants, laptop computers, palm computers, heads-up displays and/or other portable equipment.

The always-on nature of the present invention may be further supported by maintaining an accurate timing reference to enable rapid, low-power reacquisition after periods when the satellite signals are not available. In addition to optimizing power consumption, the always on satellite positioning receiver may improve the operation of location-based applications and location-based services by eliminating a user interaction with the equipment to command a position fix.

The functions performed by the diagrams of FIGS. 1-7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of RFICs, ASICs, FPGAs or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for establishing a position of a device, comprising the steps of:
   (A) receiving an input signal from a receiver listening to a plurality of satellites in a positioning system;
   (B) calculating (i) a plurality of estimated Doppler shifts of said satellites, (ii) an estimated position of said device and (iii) an estimated velocity of said device;
   (C) calculating a plurality of estimated locations of a plurality of pseudo-random code sequences in said input signal based on all of (i) said estimated position of said device and (ii) said estimated velocity of said device;
   (D) generating a plurality of pseudo-ranges in an intermediate signal based on said estimated locations; and
   (E) generating said position in an output signal based on said pseudo-ranges.

2. The method according to claim 1, wherein step (D) further comprises the sub-step of:
   tracking said pseudo-random code sequences by performing a plurality of limited searches in both time and frequency approximate said estimated locations.

3. The method according to claim 1, wherein said estimated locations are calculated for at most six of said satellites.

4. The method according to claim 1, wherein said calculation of said estimated locations of said pseudo-random code sequences continues while said pseudo-random code sequences are unsuitable to track.

5. The method according to claim 1, further comprising the step of:
   reporting a sequence of estimated values for said position in said output signal while said pseudo-random code sequences are unsuitable to track.

6. The method according to claim 1, further comprising the step of:
   calculating both (i) said estimated position of said device and (ii) said estimated velocity of said device based on (a) a previous position of said device and (b) a previous velocity of said device.

7. A method for establishing a position of a device, comprising the steps of:
   (A) receiving an input signal from a receiver listening to a plurality of satellites in a positioning system;
   (B) calculating (i) a plurality of estimated Doppler shifts of said satellites, (ii) an estimated position of said device and (iii) an estimated velocity of said device;
   (C) generating a plurality of pseudo-ranges in an intermediate signal based on all of (i) said input signal, (ii) said estimated Doppler shifts, (iii) said estimated position and (iv) said estimated velocity;
   (D) generating said position in an output signal based on said pseudo-ranges; and
   (E) reducing a power consumed by said receiver between updates of said position.

8. The method according to claim 1, further comprising the step of:
   generating said position using a fast acquisition technique in response to at least one of (i) a power up of said device and (ii) a command to quickly establish said position from an unknown state.

9. The method according to claim 8, further comprising the step of:
   reducing a power consumed by said fast acquisition technique after said position has been determined at least once.

10. The method according to claim 1, wherein said position is generated from at most four of said satellites.

11. The method according to claim 10, wherein said at most four satellites are a combination of said satellites heard by said receiver that results in a best geometric dilution of precision metric.

12. A device comprising:
    a tracking engine configured to (i) receive an input signal from a receiver listening to a plurality of satellites in a positioning system, (ii) calculate a plurality of estimated Doppler shifts of said satellites and (iii) calculate a plurality of estimated locations of a plurality of pseudo-random code sequences in said input signal based on all of (a) an estimated position of said device and (b) an estimated velocity of said device and (iv) generate a plurality of pseudo-ranges in an intermediate signal based on said estimated locations; and
    a position calculator co-located with said tracking engine and configured to generate (i) said estimated position, (ii) said estimated velocity and (iii) said position in an output signal based on said pseudo-ranges.

13. The device according to claim 12, wherein said tracking engine is further configured to (i) calculate said estimated locations of said pseudo-random code sequences while said pseudo-random code sequences are unsuitable to track.

14. The device according to claim 12, further comprising a fast acquisition engine configured to establish said position in response to at least one of (i) a power up of said device and (ii) a command to quickly establish said position from an unknown state.

15. The device according to claim 14, further comprising a power controller configured to reduce a power consumption of said fast acquisition engine after establishing said position at least once.

16. The device according to claim 12, wherein said device comprises at least one of (i) a cell phone, (ii) a laptop computer, (iii) a palm computer, (iv) a personal digital assistant and (v) a heads-up display.

17. A device comprising:
    means for (i) receiving an input signal from a receiver listening to a plurality of satellites in a positioning system, (ii) calculating a plurality of estimated Doppler shifts of said satellites and (iii) calculating a plurality of estimated locations of a plurality of pseudo-random code sequences in said input signal based on all of (a) an estimated position of said device and (b) an estimated velocity of said device and (iv) generating a plurality of pseudo-ranges in an intermediate signal based on said estimated locations; and
    means for generating (i) said estimated position, (ii) said estimated velocity and (iii) said position in an output signal based on said pseudo-ranges, said means for generating being co-located with said means for calculating said estimated Doppler shifts.

18. The device according to claim 12, further comprising a power controller configured to reduce a power consumed by said receiver between updates in said position.

19. The device according to claim 12, wherein said position circuit is further configured to report a sequence of estimated values for said position in said output signal while said pseudo-random code sequences are unsuitable to track.

20. The device according to claim 12, wherein said estimated locations are calculated for at most six of said satellites.

* * * * *